United States Patent
Lee et al.

(10) Patent No.: US 11,057,522 B2
(45) Date of Patent: Jul. 6, 2021

(54) INTELLIGENT CALLBACK SERVICE PROVIDING SYSTEM

(71) Applicant: MindwareWorks Co., Ltd., Seoul (KR)

(72) Inventors: Jae In Lee, Goyang-si (KR); Hyun Sun Cho, Seoul (KR)

(73) Assignee: MindwareWorks Co., Ltd., Seoul (KR)

( * ) Notice: Subject to any disclaimer, the term of this patent is extended or adjusted under 35 U.S.C. 154(b) by 0 days.

(21) Appl. No.: 16/640,066

(22) PCT Filed: Aug. 3, 2018

(86) PCT No.: PCT/KR2018/008826
§ 371 (c)(1),
(2) Date: Feb. 19, 2020

(87) PCT Pub. No.: WO2019/059520
PCT Pub. Date: Mar. 28, 2019

(65) Prior Publication Data
US 2020/0228657 A1    Jul. 16, 2020

(30) Foreign Application Priority Data
Sep. 22, 2017  (KR) .................. 10-2017-0122304

(51) Int. Cl.
*H04M 3/523*    (2006.01)
*H04M 3/42*     (2006.01)
(Continued)

(52) U.S. Cl.
CPC ..... *H04M 3/5231* (2013.01); *H04M 3/42076* (2013.01); *H04M 3/42382* (2013.01);
(Continued)

(58) Field of Classification Search
CPC .......... H04M 3/5231; H04M 3/42076; H04M 3/42382; H04M 3/5175
(Continued)

(56) References Cited

U.S. PATENT DOCUMENTS 9,848,082 B1 * 12/2017 Lillard ................. H04M 3/5231
2013/0054684 A1 * 2/2013 Brazier ............... H04M 3/5231
                                                             709/203

FOREIGN PATENT DOCUMENTS

JP    2012-217001 A    11/2012
KR   10-2002-0046717 A   6/2002
(Continued)

OTHER PUBLICATIONS

International Search Report for PCT/KR2018/008826 dated Nov. 6, 2018 from Korean Intellectual Property Office.

*Primary Examiner* — Ahmad F. Matar
*Assistant Examiner* — Jirapon Intavong
(74) *Attorney, Agent, or Firm* — Revolution IP, PLLC (57) ABSTRACT

An intelligent message processing system includes: a customer terminal configured to receive an intelligent callback service; a service provider terminal configured to send a callback message to the customer terminal; and a chatbot service providing server configured to provide an interactive callback service after the customer terminal checks the callback message, the service provider terminal comprising an intelligent agent configured to generate and send a callback message, which reflects at least one piece of information between message information received from the customer terminal and customer history information stored and managed in a customer database, or a preset callback message to the customer terminal.

1 Claim, 3 Drawing Sheets

(51) Int. Cl.
*H04M 3/493* (2006.01)
*H04M 3/51* (2006.01)

(52) U.S. Cl.
CPC ....... *H04M 3/4933* (2013.01); *H04M 3/5175* (2013.01); *H04M 3/5191* (2013.01)

(58) Field of Classification Search
USPC .................................................. 379/210.01
See application file for complete search history.

(56) References Cited

FOREIGN PATENT DOCUMENTS

| | | |
|---|---|---|
| KR | 10-0340097 B1 | 6/2002 |
| KR | 10-2004-0069511 A | 8/2004 |
| KR | 10-1066277 B1 | 9/2011 |
| KR | 10-2016-0010190 A | 1/2016 |
| WO | WO-2016010275 A1 * | 1/2016 .............. H04M 3/50 |

* cited by examiner

INTELLIGENT CALLBACK SERVICE PROVIDING SYSTEM

TECHNICAL FIELD

The disclosure relates to an intelligent callback service providing system, and more particularly to an intelligent callback service providing system which improves a customer satisfaction level by providing a specific, accurate and quick response to a customer and enables a service provider to easily manage customers and continuously provide a high-quality service to the customers.

BACKGROUND ART

As functions of linking an incoming phone call or text message from a mobile phone or a landline to another designated phone number, or automatically notifying of a text message designated for an incoming call, there are a callback message service and a callback uniform resource locator (URL) message service.

Specifically, the callback message service refers to a service of sending a preset text message to a customer who makes a call or leaves a text message when it is impossible to respond to an incoming phone call or a callback function is turned on, and the callback URL message service refers to a service of automatically sensing a message such as "No one is here to answer your call right now. If you have any questions, please visit our website http://www.kt.com."

Recently, various services have been provided using the callback URL message service. For example, Korean Patent No. 10-1066277 (hereinafter, referred to as the "related art") has disclosed technology that relates to a teleconsulting service for the dentist, and more specifically, sends a callback URL to a mobile phone of a customer (i.e. a prospective patient) to receive image information and provides a medical service based on the received image information.

However, the related art merely involves technical features of transmitting and receiving the image information through the callback URL, but not corresponds to technology of sending a callback URL message reflecting a voice or text message to a customer when the customer leaves the voice or text message.

Like this, the callback URL message generally refers to a typical message that involves a URL for consultation or reference. Therefore, a problem arises in that a customer who received the callback URL message cannot accurately and quickly get an answer s/he wants.

DISCLOSURE

Technical Problem

The disclosure is conceived to solve the problems of the related art as described above, and an aspect of the disclosure is to provide an intelligent callback service providing system which sends a callback message, in which at least one piece of information between message information received from a customer terminal and customer history information about a customer who left a message is reflected, to a customer terminal unlike a conventional callback service which transmits only a preset callback message, and enables the customer terminal to check the callback message and then receive an interactive callback service from a chatbot service providing server, thereby improving a customer satisfaction level by providing a specific, accurate and quick response to a customer and enabling a service provider to easily manage customers and continuously provide a high-quality service to the customers.

TECHNICAL SOLUTION

To achieve the foregoing technical aspects as described above, the disclosure proposes an intelligent message processing system including: a customer terminal configured to receive an intelligent callback service; a service provider terminal configured to send a callback message to the customer terminal; and a chatbot service providing server configured to provide an interactive callback service after the customer terminal checks the callback message, the service provider terminal including an intelligent agent configured to generate and send a callback message, which reflects at least one piece of information between message information received from the customer terminal and customer history information stored and managed in a customer database, or a preset callback message to the customer terminal.

Here, the message information received from the customer terminal may include a text message or a voice message, and the customer database may include a built-in database provided in the service provider terminal or a separate external database accessible by the service provider terminal.

Further, the intelligent agent may send a uniform resource locator (URL) message added with a parameter corresponding to the generated callback message to the customer terminal and send the callback message and a parameter corresponding to the callback message to the chatbot service providing server, and the customer terminal may display the callback message when a customer selects a URL.

Further, the chatbot service providing server may refer to customer history information of the customer database and provide an interactive callback service to the customer terminal.

ADVANTAGEOUS EFFECTS

With the foregoing problems and solutions, an intelligent callback service providing system according to the disclosure sends a callback message, in which at least one piece of information between message information received from a customer terminal and customer history information about a customer who left a message is reflected, to a customer terminal unlike a conventional callback service which transmits only a preset callback message, and enables the customer terminal to check the callback message and then receive an interactive callback service from a chatbot service providing server, thereby having advantages of improving a customer satisfaction level by providing a specific, accurate and quick response to a customer and enabling a service provider to easily manage customers and continuously provide a high-quality service to the customers.

BEST MODE

Figure 1:
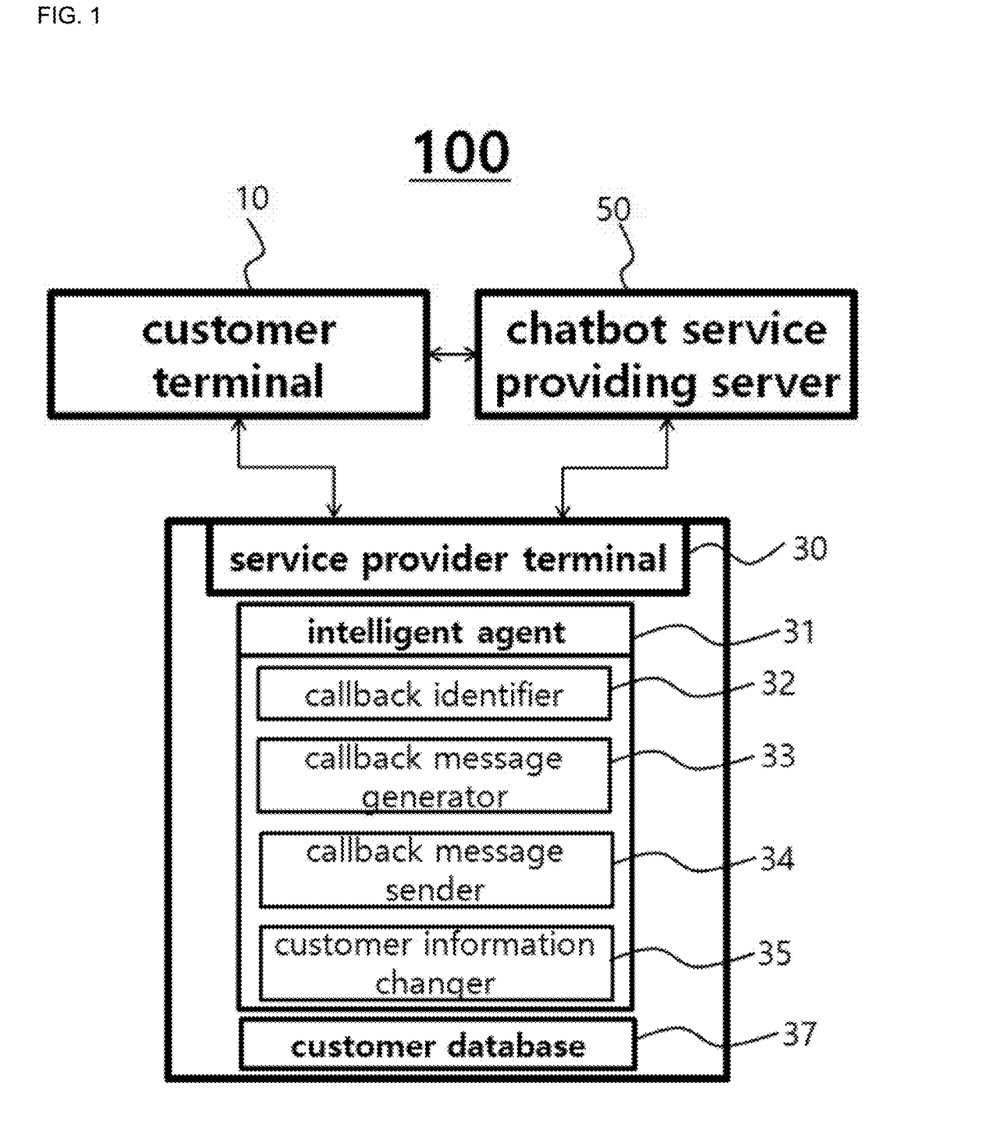
FIG. 1 is a block diagram of an intelligent callback service providing system according to an embodiment of the disclosure.

Referring to FIG. 1, the disclosure relates to an intelligent callback service providing system, and further relates to an intelligent callback service providing system with a chatbot service providing server to provide an interactive service.

As shown in FIG. 1, the intelligent callback service providing system 100 according to an embodiment of the disclosure fundamentally includes a customer terminal 10 owned by customers who receive a service, a service provider terminal 30 owned by business owners and parties concerned who provide various services to the customers, and a chatbot service providing server 50 providing a callback service in the form of an interactive chatbot service to the customer terminal 10 by acting as a proxy for a service provider that has previously signed up for a membership and made a service providing contract.

First, the callback service according to the disclosure has a concept of including not only a service that the service provider terminal 30 generates a uniform resource locator (URL) message and transmits the URL message to the customer terminal 10 in a case where a phone call or a text message comes from the customer terminal 10 when the service provider cannot answer a phone call, business hours are over, or the service provider has a day off, but also a service that the chatbot service providing server 50 gives an answer in an interactive message to the customer terminal 10 by acting as a proxy for the service provider terminal 30.

The customer terminal 10 refers to terminals owned by customers who receive various services, and may correspond to any terminal as long as it can be used by people to make a call or send a text message. For example, the customer terminal 10 may include various mobile phones such as a smart phone, etc., a terminal supporting a phone-call function, various networks capable of sending a text message, a computing terminal, and so on.

Further, the customer may receive various services, for example, many services available in daily life, such as use of a restaurant, purchase of goods, use of a fitness center, use of hospital, etc. Therefore, the customer may make a phone call or send a text message to the service provider so as to make various inquiries about provision of services, and make various promises, agreements, schedules, rescheduling, etc. related to the services.

Like this, the customer terminal 10 is used by the customer to receive various services from the service provider through the phone call or text message. According to the disclosure, when a customer who is using the customer terminal 10 cannot receive various services by speaking to the service provider on the phone, the customer terminal 10 receives not a conventional common callback message but an intelligent callback message reflecting the customer's intention and history information.

That is, the customer terminal 10 according to the disclosure receives an intelligent callback service. As described above, the intelligent callback service refers to not a service for sending the conventional common callback message such as "No one is here to answer your call right now. Please call again a little later," "Business hours are over now. Please call again tomorrow during business hours", etc., but a service of sending a call back message which reflects text message information, voice message information, etc. sent by the customer terminal 10. Further, the intelligent callback service refers to a service of giving customer services through interactive messages by the chatbot service providing server 50.

The service provider terminal 30, which sends the intelligent callback service, i.e. The callback message reflecting the text message information, the voice message information, etc. given by the customer terminal 10 to the customer terminal 10, may be achieved by various terminals capable of making a phone call to or exchanging a message with the customer terminal 10, and may further be achieved by an automatic response system (ARS) receiving server of a call center which can be operated by large-scale companies.

That is, the service provider terminal 30 not only transmits the callback message to the customer terminal 10, but also makes a voice call to the customer terminal 10, and includes any terminal as long as it can transmit and receive a text message. Therefore, the service provider terminal 30 may include a general terminal for a service provider, various terminals having an automatic response function, and a terminal of a broader concept including an ARS receiving server of a call center that can be operated by large-scale companies.

The service provider terminal 30 refers to a terminal owned by the service provider, and may include a mobile terminal always carried by the service provider or a stationary terminal placed in a shop or store run by the service provider. The service provider terminal 30 generates a callback message different from the conventional message and sends the generated callback message to the customer terminal 10 when it is identified that the service provider cannot answer a phone call, i.e. needs to make a callback response.

The callback message sent to the customer terminal 10 may be checked by the customer. When the customer selects the callback message to be checked in the customer terminal 10, the customer terminal 10 is linked to the chatbot service providing server 50 and receives continuous callback service through the interactive message.

Like this, the chatbot service providing server 50 can provide the interactive callback service to the customer terminal 10 through the interactive message, after the customer terminal 10 checks the callback message sent from the service provider terminal 30, the interactive message. Therefore, the customer terminal 10 can receive a desired and satisfactory callback service through the service provider terminal 30 and the chatbot service providing server 50.

The chatbot service providing server 50 acts as a proxy for a direct response of the service provider terminal 30. Here, the chatbot service providing server 50 takes the customer's history information and the like into account to act as a proxy for the service provider through the intelligent interactive message, thereby making the response to the customer. To provide the optimum intelligent callback service, the chatbot service providing server 50 receives relevant information from the service provider terminal 30, and further has an access to and refers to a customer database 37 in which a customer's history information is stored and managed.

Like this, the chatbot service providing server 50 because it can receive the relevant information from the service provider terminal 30, and further have an access to and refer to the customer database 37 in which the customer's history information is stored and managed, thereby providing the optimum interactive callback service to the linked customer terminal 10 through a suitable interactive message.

As described above, the intelligent callback service providing system 100 with this configuration according to the disclosure does not simply provide a conventional common callback message service such as "No one is here to answer your call. Please call again a little later," etc. but provides a callback service through an intelligent callback message of more accurately and quickly suggesting a solution as desired by a customer.

To this end, the service provider terminal 30 according to the disclosure includes an intelligent agent 31 which does not generate and send a conventional common callback message to the customer terminal 10 but generates and sends the intelligent callback message of suggesting a solution as desired by a customer who owns the customer terminal 10 and reflecting the customer's intention.

Specifically, the service provider terminal 30 includes the intelligent agent 31 that generates and transmits a callback message, which reflects at least one piece of information between message information transmitted from the customer terminal 10 and customer history information stored and managed in the customer database, or a preset callback message to the customer terminal 10.

Like this, the service provider terminal 30 includes the intelligent agent 31, and the intelligent agent 31 generates and sends the callback message to the customer terminal 10 when it is identified that the service provider cannot answer a phone call, i.e. needs to make a callback response. In preference to generating and sending the callback message, the intelligent agent 31 needs to analyze and reflect at least one piece of information among the message information a customer left in the service provider terminal 10, the information stored and managed in the customer database 37, and the history information about the customer who leaves the message information. When there are no message information that the customer left and no history information about the customer who made the phone call, the intelligent agent 31 generates and transmits the preset callback message.

To make various service inquiries or receive various services, the customer may use his/her own customer terminal 10 to make a phone call or send a text message to the service provider. The customer may leave a voice message or a text message when the customer does not talk to the service provider, or may directly leave the text message without making a phone call.

Therefore, the intelligent agent 31 may obtain a phone number of a customer who makes a phone call or sends a text message, and obtain and analyze the voice or(and) text message information. Further, the intelligent agent 31 may identify whether the customer history information stored and managed matching the obtained phone number of the customer is present in the customer database 37.

Thus, the intelligent agent 31 may obtain and analyze the message information transmitted from the customer terminal 10 and(or) the customer history information storage and managed in the customer database 37, and generate and send a callback message, in which the message information and(or) the customer history information are reflected based on the analysis, to the customer terminal 10.

Meanwhile, when it is identified that the customer makes only a phone call without leaving the voice message or the text message and the customer history information stored and managed matching the phone number of the customer is not present in the customer database 37, the intelligent agent 31 generates and sends the preset callback message to the customer terminal 10.

The message information obtained and analyzed by the intelligent agent 31 to provide the intelligent callback service, that is, the message information transmitted from the customer terminal 10 includes the text message information transmitted and left by the customer terminal 10 or the voice message information transmitted and left by the customer terminal 10 as the phone call failed.

Meanwhile, the customer database 37, which the intelligent agent 31 refers to, may include a built-in database provided inside the service provider terminal 30, or a separate external database connected to the service provider terminal 30 accessible through a wired/wireless network.

In other words, the customer database 37 may be provided inside the service provider terminal 30 carried by the service provider or installed in a shop (or store) so that the intelligent agent 31 can immediately refer to the customer database 37, or may be not placed inside but connected to the service provider terminal 30 through a wired or wireless network so that the service provider terminal 30 can have an access to the customer database 37.

Meanwhile, the customer database 37 may be achieved in various forms as long as it can store and manage the customer history information. For example, the customer database 37 may include a schedule management database related to a customer, a scheduling management database related to a customer, a calendar related to a customer, and various other databases related to a customer.

However, the customer database 37 stores and manages the customer history information while matching a phone number of a customer. Because the phone number is the most basic information obtained as the intelligent agent 31 refers to the customer database 37 and makes a phone call to the customer and receives the voice or text message, it is preferable that the customer history information is stored and managed in the customer database 37 while matching the phone number of the customer.

The customer history information stored and managed in the customer database 37 includes not only the past history information but also any history information that may occur in the future due to scheduling or the like. Further, the customer history information may include not only service history information (e.g. a scheduled date, a scheduled time, a purchased item, a purchasing method, etc.) about various services that have been provided or will be provided, but also basic personal information (e.g. name, address, etc.) of a customer.

Meanwhile, the intelligent agent 31 may transmit the generated callback message to not only the customer terminal 10 but also the chatbot service providing server 50. However, the intelligent agent 31 may transmit the callback message in the same form to the customer terminal 10 and the chatbot service providing server 50, but may transmit the callback message in different forms by taking a message transmission amount or the like into account.

Specifically, the intelligent agent 31 may transmit a URL message added with a parameter corresponding to the generated callback message to the customer terminal 10, and transmit the callback message and the corresponding parameter to the chatbot service providing server 50, and the callback message is displayed on the customer terminal 10 when a customer selects the URL.

When the intelligent agent 31 generates a callback message, the callback message is not directly and fully sent to the customer terminal 10, but converted into a corresponding parameter and transmitted to the customer terminal 10 in the form of a URL message in which this parameter is added to the URL. The URL refers to URL information for a link with the chatbot service providing server 50. In other words, when the customer clicks and selects the URL, the customer terminal 10 is linked to the chatbot service providing server 50 and exchanges the interactive message with the chatbot service providing server 50, thereby checking the callback message sent from the intelligent agent 31 and then continuously receiving the callback services to receive a desired service (e.g. scheduling change, etc.).

As described above, the intelligent agent 31 sends the URL message added with the parameter to the customer terminal 10. For example, the intelligent agent 31 may send the URL message converted in the form of "http://chatbot.com/Ad2da?1231423" to the customer terminal 10. In the URL message, a part of "http://chatbot.com/Ad2da" corresponds to the URL information of the chatbot service providing server 50, and a part of "1231423" corresponds to an added parameter, i.e. a parameter converted corresponding to the callback message generated by the intelligent agent 31 reflecting the message information and(or) the customer history information.

Like this, the intelligent agent 31 sends the URL message added with the parameter converted corresponding to the generated callback message to the customer terminal 10, and sends both the parameter and the generated callback message corresponding to the parameter to the chatbot service providing server 50. Meanwhile, the intelligent agent 31 transmits unique information (e.g. the phone number, etc.) of the customer terminal 10 and unique information (e.g. the membership information, etc.) of the service provider terminal when sending both the parameter and the generated callback message corresponding to the parameter.

Then, when a customer clicks and selects the URL received in the customer terminal 10, connection is automatically made to the link of the chatbot service providing server 50 corresponding to the URL, and at the same time the chatbot service providing server 50 identifies the parameter and transmits the callback message corresponding to the parameter to the customer terminal 10 so that the callback message can be displayed in the customer terminal 10. Ultimately, when the customer clicks and selects the URL, a chat window is popped up in the customer terminal 10 and the callback message generated by the intelligent agent 31 is automatically displayed.

As described above, when the customer terminal 10 and the chatbot service providing server 50 are connected, the customer terminal 10 can continuously receive a callback service from the chatbot service providing server 50 through the interactive message. In other words, the customer terminal 10 may send a response message or a request message after checking the callback message displayed on the chat window by clicking and selecting the URL, and the chatbot service providing server 50 may generate and send the interactive message to provide a service desired by the customer terminal 10, so that the callback service can be continuously provided, thereby completing the provision of the service desired by the customer.

To satisfy the customer, the chatbot service providing server 50 has to intelligently generate a message and send the message to the customer terminal 10. To this end, the chatbot service providing server 50 needs to refer to the history information of the customer. Therefore, the chatbot service providing server 50 is allowed to access the customer database 37 when connected to the customer terminal 10, thereby referring to the history information related to the customer.

In other words, the chatbot service providing server 50 may refer to the customer history information of the customer database 37 and provide the interactive callback service to the linked customer terminal 10. Because the chatbot service providing server 50 refers to the history information about the customer who owns the linked customer terminal 10, the chatbot service providing server 50 can generate and provide an interactive callback message reflecting the history information, thereby accurately, quickly and easily providing the service (e.g. scheduling, scheduling change, etc.) the customer wants.

MODES FOR CARRYING OUT THE INVENTION

In the foregoing intelligent callback service providing system 100 according to the disclosure, the intelligent agent 31 generates and sends a basic callback message, and the customer terminal 10 carries out the URL link and then continuously exchanges an interactive callback message with the chatbot service providing server 50, thereby providing the intelligent callback service to the customer terminal 10.

The intelligent agent 31 for generating and sending the basic callback message includes a callback identifier 32, a callback message generator 33, a callback message sender 34, and a customer information changer 35, as shown in FIG. 1.

The callback identifier 32 identifies whether there is a need of making a response based on a callback service. Specifically, the callback identifier 32 identifies whether there is a need of making a response based on a callback service, based on whether the service provider previously sets a callback response, whether the service provider does not answer a phone call tried by a customer, or whether the service provider is unable to answer the phone call under situation information.

When the service provider gets a phone call from a customer, a callback service response may be previously set to be automatically made. Further, when the service provider does not answer a phone call even though there is an incoming phone call from the customer, the callback service response may be made. Further, when it is identified that the service provider is in a situation where the service provider is unable to answer a phone call (e.g. while asleep, working, etc.), based on the situation information collected through various sensors or the like, the callback service response may be made.

Like this, the callback identifier 32 identifies a callback response and instructs the callback message generator 33 to generate a callback message when it is identified that the service provider previously sets an automatic callback response, or the service provider does not answer a phone call or is in a situation that it is impossible to answer the phone call.

Then, the callback message generator 33 first identifies whether there is a left message sent from the customer terminal 10, i.e. there is a voice message or a text message. As a result of the identification, when the voice message or the text message is present, major information about a customer's request is extracted by analyzing the voice or text message information.

The callback message generator 33 extracts a phone number of a customer who sends the voice message or the text message, refers to the customer database 37 to check whether the phone number of the customer is stored and managed, and refers to the customer history information stored matching the phone number of the customer when the phone number of the customer is present.

Like this, when it is identified that the voice or text message is present and at the same time there is the history information about the customer who left the message in the customer database 37, the callback message generator 33 generates a callback message by analyzing and reflecting not only the voice message information or the text message information but also the customer history information stored and managed matching the phone number of the customer who sent and left the message.

On the other hand, there may be no history information about a customer who left the message in the customer database 37 even though the voice or text message is present. In this case, the callback message generator 33 generates a callback message by analyzing and reflecting only the voice message information or the text message information.

Meanwhile, the customer may not leave the voice message or the text message as described above when the customer makes a phone call to the service provider but the service provider does not answer the phone call. Like this, when the voice message or the text message is not given, the callback message generator 33 extracts the phone number of the customer who made the phone call. Because a phone number of a caller is usually given, it is easy to extract the phone number.

When it is identified that the customer history information corresponding to the phone number of the customer who made the phone call is present in the customer database 37 without the text or voice message, the callback message generator 33 generates a callback message by analyzing and reflecting only the customer history information.

On the other hand, the voice or text message may not be present and the history information about the customer who made the phone call may not be present in the customer database 37. In this case, the callback message generator 33 generates a preset callback message. The service provider may previously set such a callback message for the purpose of a callback service for a new customer who leaves no messages and is not managed in the customer database 37.

The callback message generated as above is sent to the callback message sender 34, and the callback message sender 34 generates a parameter corresponding to the generated callback message, and sends a URL message, in which the generated parameter is added to the URL corresponding to the address information of the chatbot service providing server, to the customer terminal 10. Further, the callback message sender 34 transmits the parameter and the generated callback message corresponding to the parameter to the chatbot service providing server 50.

Then, when the customer clicks and selects the URL through the customer terminal 10 that received the URL message, as described above, connection to the link of the chatbot service providing server 50 is automatically achieved, and the callback message is displayed while the chat window is popped up. Then, the customer terminal 10 may receive continuous interactive callback services from the chatbot service providing server 50.

Figure 2:
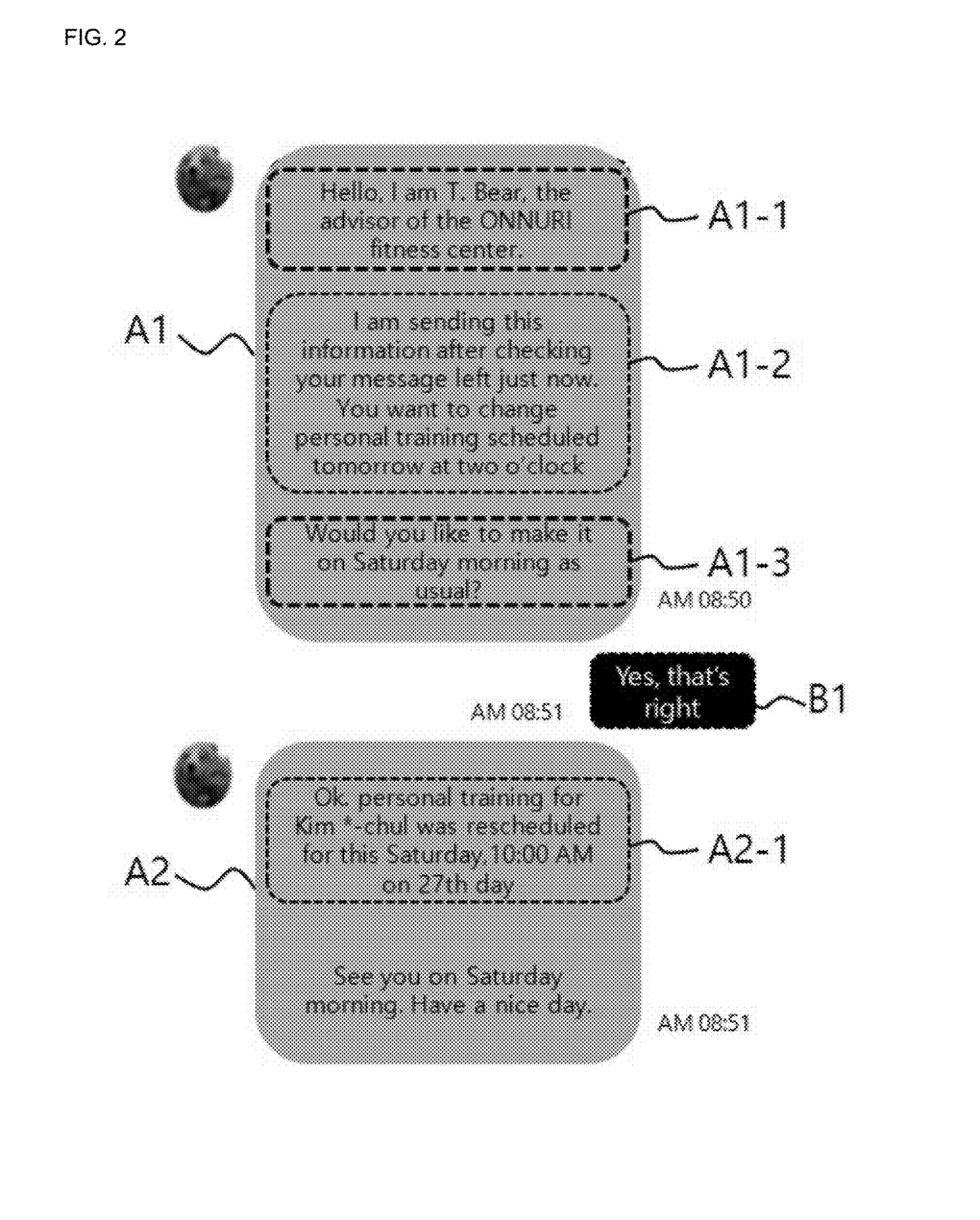
FIG. 2 shows a callback service provided through an intelligent callback service providing system according to an embodiment of the disclosure.

FIG. 2 shows an interactive message related to a callback service provided after the customer terminal 10 and the chatbot service providing server 50 are linked. Specifically, when the URL is selected, a basic callback message A1 generated by the callback message generator 33 is displayed.

The basic callback message A1 is given to illustrate an example of being generated when the callback message generator 33 analyzes and reflects not only the text or voice message but also the customer history information. Specifically, in the callback message A1, the first message A1-1 corresponds to a service provider introduction message applicable in common to callback messages, the next text message A1-2 corresponds to a message generated by analyzing and reflecting the text or voice message, and the last text message A1-3 corresponds to a message generated by analyzing and reflecting the customer history information stored and managed in the customer database 37.

In more detail, the message A1-2 "I am sending this information after checking your message left just now. You want to change personal training scheduled tomorrow at two o'clock" is summarized from analysis of the voice or text message. Further, the message A1-3 "Would you like to make it on Saturday morning as usual?" is regarded as a callback message generated by reflecting that this customer has a history of rescheduling for Saturday morning several times as a result of analyzing the customer history information.

The customer who checked the callback message A1 may send a response message "Yes, that's right" when the callback message A1 matches the customer's request, and may sent a new request message when the callback message A1 does not match the request. As shown in FIG. 2, the customer sent a positive response message B1 when the callback message A1 matches the customer's request.

Then, the chatbot service providing server 50 intelligently generates and transmits a callback message to be sent next time. Specifically, the chatbot service providing server 50 is linked to the customer terminal 10, and has an access in real time to and refer to the customer database 37 in which the customer history information of the customer is stored and managed.

In result, the chatbot service providing server 50 generates and sends the following interactive callback message A2, in which the customer history information stored and managed in the customer database 37 is referenced and reflected. Specifically, the interactive callback message A2 includes a message A2-1 reflecting the customer history information, which, as shown in FIG. 2, reflects specific information such as "Ok. personal training for Kim *-chul was rescheduled for this Saturday, 10:00 AM on 27$^{th}$ day."

The message A2-1 reflecting the customer history information reflects specific information such as the customer's name, training time and rescheduling confirmation, and such information is regarded as a result that the chatbot service providing server 50 refers to and reflects the customer history information.

The interactive callback message generated in the chatbot service providing server 50 is sent together with the unique information (e.g. the phone number, etc.) of the customer to the service provider terminal 30. Then, the customer information changer 35 carries out comparison between the customer history information (e.g. service information about scheduling, etc.) included in the interactive callback message sent together with the unique information of the customer and the history information stored and managed corresponding to the unique information (e.g. the phone number of the customer), and stores the customer history information stored and managed in the customer database, which is changed by reflecting the customer history information included in the interactive callback message, when it is identified that there is a difference therebetween.

Like this, when it is identified that the customer history information (e.g. a scheduling service, etc.) was changed in response to the request of the customer, the customer information changer 35 automatically changes and stores the customer history information stored and managed in the customer database 37, and thus the service provider does not need to separately change or modify the customer history information, thereby reducing time, effort and costs taken by the service provider to manage the customer.

Meanwhile, the callback message generated by the callback message generator 33 is also sent to the customer information changer 35. Then, the customer information changer 35 carries out comparison between the customer history information (e.g. the service information about scheduling, etc.) included in the generated callback message and the history information stored and managed corresponding to the phone number of the customer, and stores the customer history information stored and managed in the customer database, which is changed by reflecting the customer history information included in the callback message generated by the callback message generator, when it is identified that there is a difference therebetween.

The text or voice message sent by the customer may concretely include the customer's requests. For example, the text message may include specific content such as the customer's name, rescheduling day and time, etc. In this case, the customer information changer 35 automatically changes the customer history information.

Figure 3:
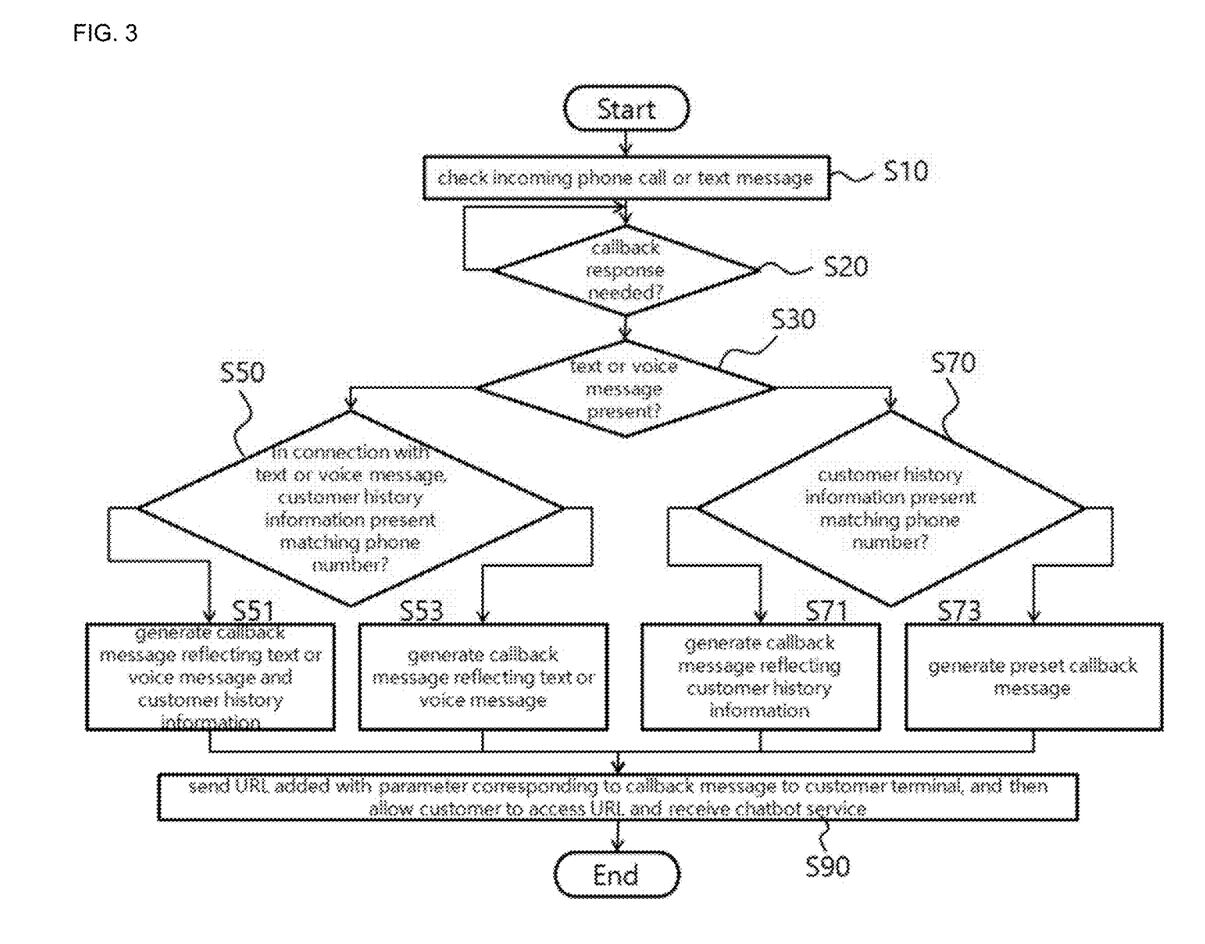
FIG. 3 is a flowchart of a callback service provided through an intelligent callback service providing system according to an embodiment of the disclosure.

According to the disclosure, the method of providing the callback service through the intelligent callback service providing system 100 may progress according to the foregoing processes, and FIG. 3 schematically shows a flowchart corresponding to the foregoing method of providing the callback service.

Schematically, when there is an incoming phone call (S10), it is identified whether to make a callback response (S20). In other words, as described above, it is identified whether there are previous settings for the callback response or the like.

When it is identified that there is a need of making the callback response, it is identified whether the text or voice message is present (S30). When it is identified that the text or voice message is present, it is additionally identified whether the customer history information is present (S50). When it is identified that the customer history information is present, a callback message is generated by reflecting both the text or voice message information and the customer history information (S51). When it is identified that the customer history information is not present, a callback message is generated by reflecting only the text or voice message information (S53).

When it is identified in the operation (S30) that the text or voice message is not present, it is identified whether the customer history information is present corresponding to the extracted phone number (S70). When the customer history information is present, a callback message is generated by reflecting the customer history information (S71). When it is identified that the customer history information is not present, a preset callback message is generated (S73).

The callback message generated through the foregoing processes is changed as described above, and sent to the customer terminal 10 and the chatbot service providing server 50. When a customer clicks and selects a URL included in the received URL message, connection is made to the link of the chatbot service providing server 30 and the chatbot service is received, thereby receiving continuous intelligent callback services (S90).

The subsequent processes include a method of generating the interactive callback message, a method of reflecting and changing the customer history information, etc. which are equivalent to those of the foregoing description.

Although a few embodiments of the disclosure have been described, these are for illustrative purpose only and it will be appreciated by a person having an ordinary skill in the art that various changes and equivalents can be made from these embodiments. Therefore, the true technical protection scope of the disclosure should be defined in the appended claims.

INDUSTRIAL APPLICABILITY

An intelligent callback service providing system according to the disclosure improves a customer satisfaction level by providing a specific, accurate, and quick response to a customer and enables a service provider to easily manage customers and continuously provide a high-quality service to the customers.

The invention claimed is:

1. An intelligent callback service providing system comprising:
   a customer terminal configured to receive an intelligent callback service;
   a service provider terminal configured to send a callback message to the customer terminal; and
   a chatbot service providing server configured to provide an interactive callback service after the customer terminal checks the callback message,
   the service provider terminal comprising an intelligent agent configured to generate and send the callback message, which reflects at least one piece of information between message information received from the customer terminal and customer history information stored and managed in a customer database, or a preset callback message to the customer terminal,
   wherein,
   the message information received from the customer terminal comprises a text message or a voice message, and the customer database comprises a built-in database provided in the service provider terminal or a separate external database accessible by the service provider terminal,
   the chatbot service providing server refers to the customer history information of the customer database and provides the interactive callback service to the customer terminal,
   the intelligent agent comprises a callback identifier, a callback message generator, a callback message sender, and a customer information changer,
   the callback identifier is configured to identify a callback response and instruct the callback message generator to generate a callback message when the service provider does not answer a phone call or is impossible to answer the phone call,
   upon the callback message generator configured that the voice message or the text message is present and at the same time there is the customer history information about who left the message in the customer database, the callback message generator is configured to generate the callback message by analyzing and reflecting not only the voice message or the text message but also the customer history information stored and managed matching a phone number of a customer who sent and left the voice message or the text message, if the customer history information about the customer who left the message is not in the customer database even though the voice message or the text message is present, the callback message generator is configured generate the callback message by analyzing and reflecting only the voice message or the text message,
   upon the callback message generator configured that the customer history information corresponding to the phone number of the customer who made the phone call from the customer terminal is present in the customer database without the text message or the voice message, the callback message generator is configured to generate the callback message by analyzing and reflecting only the customer history information, the callback message is sent to the callback message sender, and the callback message sender is configured to generate a parameter corresponding to the callback message generated by the callback message generator, is configured to send a URL message, in which the generated parameter is added to a URL corresponding to an address information of the chatbot service providing server, to the customer terminal, and is configured to transmit the parameter and the generated callback message corresponding to the parameter to the chatbot service providing server upon the customer selecting the URL through the customer terminal received the URL message, the link of the chatbot service providing server is connected automatically, and the callback message is displayed while a chat window is popped up, then the customer terminal is abled to receive the interactive callback service continuously from the chatbot service providing server the interactive callback service generated in the chatbot service providing server is sent together with a unique information of the customer to the service provider terminal, then, the customer information changer is configured to compare between the customer history information included in the interactive callback message sent together with the unique information of the customer and a history information stored and managed corresponding to the unique information, and is configured to store the customer history information stored and managed in the customer database, and the callback message generated by the callback message generator is sent to the customer information changer, then the customer information changer is configured to compare between the customer history information included in the generated callback message and the history information stored and managed corresponding to the phone number of the customer, and is configured to store the customer history information stored and managed in the customer database.

\* \* \* \* \*